United States Patent [19]

Lanzerath et al.

[11] Patent Number: 4,742,723
[45] Date of Patent: May 10, 1988

[54] CORE FOR A SYNCHRONIZER BLOCKER RING WITH BENT LUGS

[75] Inventors: Gunter Lanzerath, Heidelberg; Helmut Patzer, Sandhausen; Rudolf Muller, Ladenburg, all of Fed. Rep. of Germany

[73] Assignee: Borg-Warner Automotive, Inc., Troy, Mich.

[21] Appl. No.: 869,758

[22] Filed: Jun. 2, 1986

[30] Foreign Application Priority Data

Jun. 3, 1985 [DE] Fed. Rep. of Germany ....... 3519811

[51] Int. Cl.⁴ ............................................. F16H 3/38
[52] U.S. Cl. .................................... 74/339; 192/53 F
[58] Field of Search ............... 74/339; 192/53 F, 53 E

[56]  References Cited

U.S. PATENT DOCUMENTS

| | | | |
|---|---|---|---|
| 1,961,340 | 6/1934 | Crawford | 74/339 |
| 3,110,382 | 11/1963 | Jones | 74/339 X |
| 3,366,208 | 1/1968 | Kelbel | 192/53 F |
| 3,578,122 | 5/1971 | Magnier | 192/53 F X |
| 3,620,338 | 11/1971 | Tomita | 192/53 F |
| 3,872,737 | 3/1975 | Thomas | 74/339 |
| 4,033,437 | 7/1977 | Labat | 192/53 F |
| 4,209,086 | 6/1980 | Friedrich | 192/53 F |

FOREIGN PATENT DOCUMENTS 1000494 8/1965 United Kingdom ............ 192/53 F

Primary Examiner—Leslie A. Braun
Assistant Examiner—Dwight G. Diehl
Attorney, Agent, or Firm—James A. Geppert

[57]  ABSTRACT

A support for a synchronizing ring for the synchronization of gears, in which the stops for coupling to the clutch are formed from lugs which are bonded integrally to the sprocket ring or ring-shaped core. The support has a simple structure and can be produced economically.

8 Claims, 2 Drawing Sheets

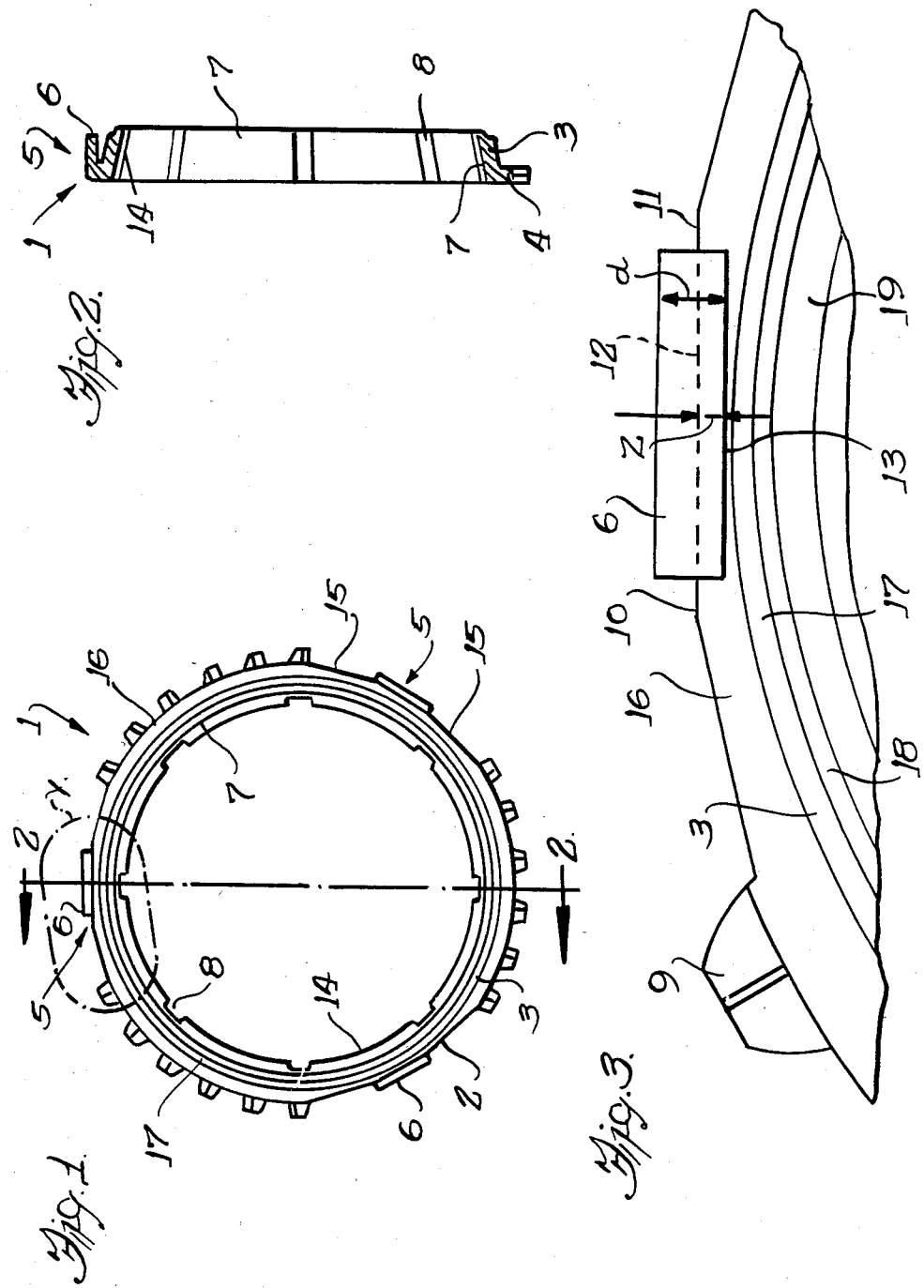

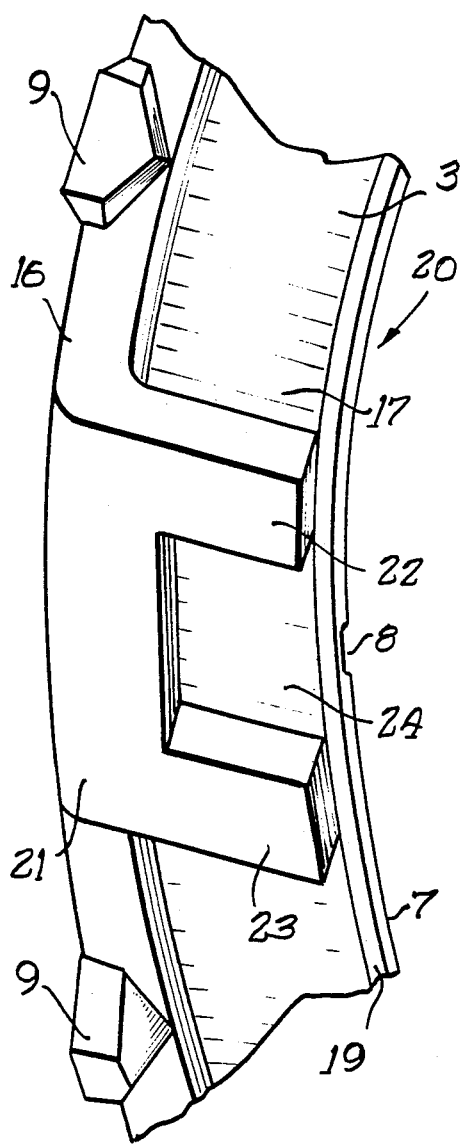
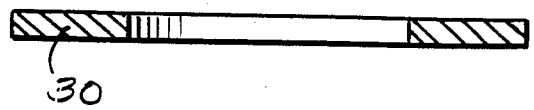
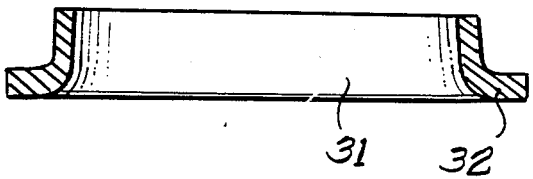
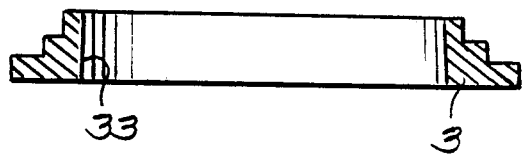
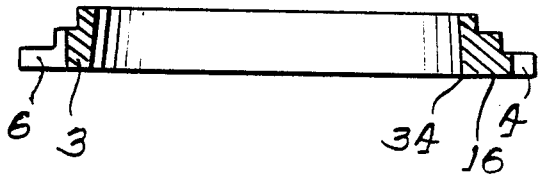
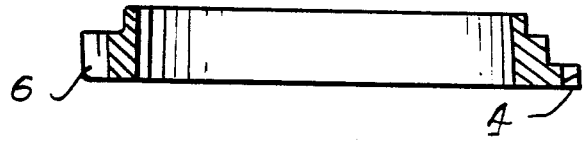

CORE FOR A SYNCHRONIZER BLOCKER RING WITH BENT LUGS

BACKGROUND OF THE INVENTION

The present invention relates to a support for a synchronizing ring for gear synchronization, with a ring-shaped body having a conical contact surface, an outer sprocket and stops for coupling to the clutch.

Various types of support are known for synchronizing rings, these supports differing especially by the selection of the material therefor. As far as design is concerned, the supports consist substantially of a ring-shaped body, which has a sprocket on the outside for positive locking with the corresponding clutch. There are several lugs or pockets, usually three displaced by 120°, on the outside of the ring-shaped body serving as stops for locking of the synchronizing ring to the clutch.

Synchronizing rings of this type are usually produced by a casting process, however, it has been proposed to produce synchronizing rings by a punching and drawing method. For example, French Pat. No. 1,553,343 describes such a method, wherein first a hat-shaped object is produced by the deep-drawing method, the edge of which is provided with a sprocket in the subsequent process steps and the bottom of which is removed. In the last process step, three pockets are applied in the ring-shaped body, these pockets serving as stops for coupling to the gear-shift sleeve. However, this synchronizing ring could not fulfill all the requirements qualitatively that were fulfilled by a synchronizing ring produced by the casting method. Thus, for example, the transition from the ring-shaped body to the sprocket ring had a rounded portion on the inside, which is undesirable because it cannot be utilized for the synchronization process. The pockets also reduce the conical contact surface.

The task of the present invention is to provide a support for a synchronizing ring, the support having an extremely simple structure which can be produced economically, and the stops are to be designed in such a way that they do not have an adverse influence on the synchronization surface.

SUMMARY OF THE INVENTION

According to the present invention, the problem of the above task is solved in the case of a support of the type mentioned at the outset by forming the stops from fins that are integrally bound to the sprocket ring or to the ring-shaped body and lie in the same direction as the surface of the ring-shaped body. Lying in the same direction means here that the fins extend in the axial direction and run tangentially to the surface of the ring-shaped body. They may lie entirely or only partially against the surface. In the case of this type of stop, the production of the synchronizing ring is possible only by using a punching, deep-drawing, bending, and stamping process. The transition from the ring-shaped body to the sprocket ring is formed as a sharp corner by subjecting the ring-shaped body to compression and calibration.

In order to be able to form the fins on the sprocket ring, a free space is provided next to each fin where the tools can be introduced during working. It is expedient if every other tooth were removed from the sprocket ring. Furthermore, it is advantageous when the material of the sprocket ring is removed to form the free space on the left and right of each fin, the removal being of such an extent that the distance between a line that connects the remaining surfaces and the edge of the conical ring-shaped portion is about the half the thickness of the fins. If necessary, the fins can also be provided with pockets.

In the method for the production of the synchronizing ring with lugs on the sprocket ring, first a ring is punched from a deep-drawable material strip. This ring is drawn to a conical ring-shaped configuration with an outer edge. This is followed by axial forming and sizing of the conical ring-shaped part to the ring-shaped body with simultaneous sizing of the conical contact surface. Then the sprocket and the fin stops or lugs are punched from the outer edge, followed by bending of the fin stops and finally, the tooth profiles will be pressed to their final form. The forming and sizing of the tooth profiles leads to a sufficient surface hardness of the teeth without subsequent machining, since when the slanting top parts are stamped, the surface finish is sufficiently hard, especially on the tooth profile. This method is extremely simple and is superior to all other methods known in the art. The pushing back of the conical ring part with sizing of the contact frictional cone is of special importance. As a result of this, the transition between the ring-shaped body and the sprocket ring will be a very sharp corner, so that the friction lining to be applied can be inserted right up to the corner. Thus, the full width of the ring-shaped body is available for the synchronization process.

In the method of production of the synchronizing ring, in which the fins are integrally bound to the ring-shaped body, first a ring is prestamped, the ring having inward extending fins on its inside edge. The ring is drawn to a conical ring-shaped part and the fins are brought to lie against the ring-shaped part by bending. Then the conical ring-shaped body is formed by final axial pressing with simultaneous forming and sizing of the conical friction cone. Finally, the sprocket wheel is punched and the tooth profile is stamped and cut.

DESCRIPTION OF THE DRAWINGS

The following are shown:

FIG. 1 shows a top plan view of the synchronizing ring;

FIG. 2 shows a section through the synchronizing ring taken on the line 2—2 of FIG. 1;

FIG. 3 shows enlarged detail X of FIG. 1;

FIG. 4 shows a section of a synchronizing ring with a pocket in the lug; and

FIGS. 5 to 9 show schematically the individual process steps in the production of the synchronizing ring.

DESCRIPTION OF THE PREFERRED EMBODIMENT

Synchronizing ring 1 shown in FIGS. 1 and 2 has a core 2, which consists substantially of a ring-shaped body 3 with a toothed rim 4. Since core 2 is to be produced by a punching and stamping process, it was not possible to attach the usual stop lugs onto the ring-shaped body 3. Also, the ring-shaped body 3 should not be interrupted by pockets for coupling purposes, as this would reduce the synchronizing surface. For this reason, stops 5 are produced which consist of bent lugs 6. The toothed rim 4 is interrupted in three places and, instead of the omitted teeth, projecting lugs 6 are present which, when bent over, provide the necessary stops for the synchronizing ring. The lugs lie tangentially to surface 17 (FIGS. 3 and 4) of the ring-shaped body 3.

In order to facilitate the bending process, a free space 15 (FIG. 1) is provided next to each lug. This is achieved by removing the neighboring teeth. In addition, a part of the spline rim 16 is removed. The contact surface 14 of the synchronizing ring is formed by a friction lining 7 consisting of paper friction material, the friction lining being provided with axial grooves 8.

Section X of FIG. 1 is shown enlarged in FIG. 3. Here the shape of the individual teeth 9 can be clearly recognized. However, above all it is intended to show the position of lugs 6. The material of the spline rim 16 is also removed on either side of each lug 6. The surfaces 10 and 11 produced in this way run parallel to the outside surface of lugs 6. If one connects the two surfaces 10 and 11 with an imaginary line 12, then the distance Z between line 12 and edge 13 of the ring-shaped body 3 is about half of the lug thickness d. This dimensional relationship is favorable when bending lugs 6.

Lugs 6 lie in an axial direction, tangentially to surface 17 of ring-shaped body 3. The edge chamfer is designated as 18, and 19 designates the leading edge of ring-shaped body 3. The friction lining is not shown in FIG. 3.

FIG. 4 shows a portion of a synchronizing ring 20 in a perspective view. Friction lining 7 with grooves 8 is placed on ring-shaped body 3. Splined rim 16 is provided with teeth 9. Lugs 21 lie adjacent surface 17 of ring-shaped body 3 and are formed in the shape of forks having two prongs 22 and 23, a pocket 24 lying between the prongs.

The method for the production of the synchronizing ring with the lugs on the spline rim 16 is carried out in the steps shown in FIGS. 5 to 9. First, a ring 30 is blanked from a deep-drawable strip of material (FIG. 5). Using a deep-drawing process, this ring 30 is drawn to a conical ring-shaped part 31 with an outer edge 32 (FIG. 6). Then the conical ring-shaped part 31 is formed and sized in the axial direction and, at the same time, the conical contact surface 33 is also formed and sized (FIG. 7). Then the ring-shaped body 3 is ready. It should be noted that, during the forming and sizing, a ring-shaped body 3 is produced having a sharp edge 34 at the transition from the ring-shaped body 3 to the splined rim 16. Then tooth rim 4 and lugs 6 are blanked out (FIG. 8). The lugs 6 are subsequently bent and the chamfers are pressed to their final form (FIG. 9).

The production of a synchronizing ring with lugs on the ring-shaped core 3 proceeds substantially according to the same principle of the method. However, it should be observed when ring 30 is prepunched, this must be punched with lugs lying toward the inside and that the bending of these fins must be carried out before forming the conical ring-shaped core 3 and forming and sizing of the friction contact cone 33.

The new support for a synchronizing ring is produced by an extremely simple method utilizing cold forming without the use of cutting machines. Experiments showed that the new support fulfills its task completely.

We claim:

1. Support for a synchronizing ring for gear synchronization with a ring-shaped core having an outer surface and a conical contact surface, an outer sprocket and stops for coupling to a synchronizing clutch, characterized by the fact that the stops are formed from lugs which are integrally bonded to a toothed rim of said outer sprocket for the ring-shaped core, said lugs extending in the same direction as said outer surface of the ring-shaped core, and a free space formed on either side of each lug, preferably by removing the neighboring teeth.

2. Support according to claim 1, characterized by the fact that the transition from the ring-shaped core to the toothed rim is a sharp corner.

3. Support according to claim 1, characterized by the fact that, in order to form the free space on opposite sides of each lug, the material of the toothed rim was removed to provide surfaces on the opposite sides of the lug which when connected by a line, the distance between the line and the inner edge of said lug is about half of the lug thickness.

4. Support according to claim 3, characterized by the fact that the lugs have pockets.

5. Support for a synchronizing ring for gear synchronization with a ring-shaped core having an outer surface and a conical contact surface, an outer sprocket and stops for coupling to a synchronizing clutch, characterized by the fact that the stops are formed from lugs which are integrally bonded to a toothed rim of said outer sprocket for the ring-shaped core, said lugs extending in the same direction as said outer surface of the ring-shaped core, each of said lugs being initially formed to extend radially outwardly from the ring-shaped core and has a pair of parallel outer edges, said lug having two prongs defining a central pocket.

6. Support according to claim 5, characterized in the fact that said lugs are bent to lie tangentially to the outer surface of said core.

7. Support according to claim 6, characterized by the fact that the outer sprocket is formed from a toothed rim, wherein the teeth adjacent said lugs are removed as well as additional material from the core rim to facilitate bending of the lugs.

8. Support according to claim 7, characterized by the fact that the surfaces of said core defined by the removed material are parallel to the outside surface of the corresponding lug.

* * * * *